United States Patent
Zheng et al.

(10) Patent No.: US 8,583,048 B2
(45) Date of Patent: Nov. 12, 2013

(54) MULTI-HOP WIRELESS SYSTEMS HAVING NOISE REDUCTION AND BANDWIDTH EXPANSION CAPABILITIES AND THE METHODS OF THE SAME

(75) Inventors: Hong Helena Zheng, Beijing (CN); Hui Lu, Beijing (CN); Jack Han Chin Tai, Irvine, CA (US)

(73) Assignee: Skyphy Networks Limited, Grand Cayman (KY)

( * ) Notice: Subject to any disclaimer, the term of this patent is extended or adjusted under 35 U.S.C. 154(b) by 1056 days.

(21) Appl. No.: 12/566,937

(22) Filed: Sep. 25, 2009
(Under 37 CFR 1.47)

(65) Prior Publication Data
US 2010/0087220 A1    Apr. 8, 2010

Related U.S. Application Data

(60) Provisional application No. 61/194,165, filed on Sep. 25, 2008.

(51) Int. Cl.
*H04B 1/00* (2006.01)

(52) U.S. Cl.
USPC ......... 455/63.1; 455/62; 455/114.2; 455/296; 370/348

(58) Field of Classification Search
USPC ............... 455/63.1, 62, 114.2, 296, 450, 455, 455/464, 509, 516; 370/348, 442
See application file for complete search history.

(56) References Cited

U.S. PATENT DOCUMENTS

| | | | | |
|---|---|---|---|---|
| 7,075,902 B2* | 7/2006 | El Batt | ........................ | 370/310 |
| 7,609,670 B2* | 10/2009 | Strutt et al. | .................... | 370/328 |
| 7,646,758 B2* | 1/2010 | Benveniste | .................... | 370/348 |
| 7,656,854 B2* | 2/2010 | Benveniste | .................... | 370/348 |
| 7,756,041 B2* | 7/2010 | Whitehill et al. | .............. | 370/238 |
| 7,881,277 B2* | 2/2011 | Hyon et al. | ...................... | 370/348 |
| 8,004,975 B1* | 8/2011 | Benveniste | .................... | 370/230 |
| 8,036,203 B2* | 10/2011 | Benveniste | .................... | 370/348 |
| 8,175,532 B2* | 5/2012 | Nanda et al. | ................. | 455/63.4 |
| 2003/0152086 A1* | 8/2003 | El Batt | .......................... | 370/400 |

(Continued)

FOREIGN PATENT DOCUMENTS

| | | | |
|---|---|---|---|
| CN | 1751243 A | | 3/2006 |
| CN | 101242208 A | | 8/2008 |

OTHER PUBLICATIONS

PCT, The International Search Report and the Written Opinion of the International Searching Authority, Jun. 18, 2009.
High Technology Letters, ISSN 1002-0470, Oct. 31, 2002, pp. 26-29, 38.

(Continued)

*Primary Examiner* — Minh D Dao
(74) *Attorney, Agent, or Firm* — Eastwind Consultants Co., Ltd.; Jenny Chen

(57) ABSTRACT

The present invention provides methods for noise reduction and bandwidth expansion in wireless communication and the devices thereof. The method in accordance with the present invention may include identifying a plurality of neighbor nodes with respect to a central node; sending a first communication signal to the plurality of neighbor nodes, wherein the first communication signal is only sent to the nodes that are considered as the plurality of neighbor nodes by the central nodes; and based on the first communication signal, when the central node is transmitting data to one of the plurality of neighbor nodes, the other nodes of the plurality of neighbor nodes do not send data in the same channel, thereby reducing the noise in the wireless network.

26 Claims, 3 Drawing Sheets

(56) References Cited

U.S. PATENT DOCUMENTS

| | | | |
|---|---|---|---|
| 2006/0281404 A1* | 12/2006 | Lee et al. | 455/11.1 |
| 2007/0002814 A1* | 1/2007 | Benveniste | 370/338 |
| 2008/0026797 A1* | 1/2008 | Nanda et al. | 455/562.1 |
| 2008/0171552 A1* | 7/2008 | Hyon et al. | 455/450 |
| 2012/0057515 A1* | 3/2012 | Wu et al. | 370/312 |

OTHER PUBLICATIONS

Ning Luyou, Zhang Zhongzhao, Zhang Naitong, Adopting Power Control in MACA Protocol for Mobile Ad Hoc Networks, High Technology Letters, Jul. 20, 2001, p. #26-29 and 38, vol. 2002-10, Communication Research Center, Harbin Institute of Technology, Harbin 150001.

* cited by examiner

MULTI-HOP WIRELESS SYSTEMS HAVING NOISE REDUCTION AND BANDWIDTH EXPANSION CAPABILITIES AND THE METHODS OF THE SAME

This application is related to and claims priority to U.S. Provisional Application No. 61/194,165, filed on Sep. 25, 2008, by the applicants Hong Helena Zheng, Hui Lu, and Jack Han Chin Tai, entitled "Multi-hop wireless systems having noise reduction and bandwidth expansion capabilities and the methods of the same." This application is also related to U.S. Non-Provisional application Ser. No. 12/567,078, entitled "Wireless communication methods utilizing single antenna with multiple channels and the devices thereof" filed concurrently herewith and incorporated herein by reference.

FIELD OF THE INVENTION

The present invention relates to wireless communication; more particularly, the present invention relates to multi-hop wireless systems having noise reduction and bandwidth expansion capabilities and the methods of the same.

BACKGROUND OF THE INVENTION

Unlike that of a single hop wireless network, the wireless communication channel of a multi-hop wireless network is a shared communication channel. In the multi-hop wireless network, only nodes within a given coverage area of a central node (referred to as neighbor nodes) can receive packet information sent by the central node, whereas nodes outside of the coverage area of the central node cannot sense the existence of packet information being communicated between the central node and its neighbor nodes. This is one of the advantages of the multi-hop wireless network in that the nodes outside of the given coverage area of a receiving node (also known as the central node) will not be affected by the data transmission and the packet information exchange within the coverage area. Therefore, the nodes outside of the coverage area of the receiving node can transmit their own packet information and data to their respective neighbor nodes at the same time.

In the conventional art, one of the problems with multi-hop wireless communication is that the location of the nodes within the given coverage area greatly affects the chance of a data collision occurred in the area. In the communication channel of the single hop wireless network, data collision is a global event. In other words, if not all of the nodes receive the correct packet information, all nodes will sense the data collision. However, because the multi-hop wireless network utilizes the Carrier Sense Multiple Access with Collision Avoidance (CSMA/CA) method, data collision is a local event. That is, nodes that are not within the coverage area of the central node may not receive the packet information and may consequently become "hidden nodes" to the central node. These hidden nodes may be problematic as they move within the coverage area of the central node because they have not received any packet information about the central node and because the central node does not recognize them as its neighbor node. As a result, the hidden nodes may mistakenly send data to the central node when the central node is busy transmitting data with one of its neighbor nodes, causing data collision in the network.

Refer to FIG. 1, which illustrates an example of a coverage area of each node in the wireless communication network in accordance with one embodiment of the present invention. As shown in FIG. 1, when node C sends out its packet information, because node A is not within the coverage area of node C, node A becomes a hidden node that cannot receive the packet information sent by node C. As a result, node A may mistakenly send data to node C when node C is transmitting data with one of its neighbor nodes, such as node D, causing data collision within the coverage area of node C.

One way to resolve the hidden node problem in the conventional art is to for a transmitting node to perform a short handshake with a receiving node before the transmitting node begins to transmit data. For example, sending a Request to Send (RTS) signal and/or a Clear to Send (CTS) signal is one way to implement the short handshake.

However, the introduction of sending the RTS and CTS signals will affect the overall network performance. If a transmission power of the CTS signal is too large, then irrelevant nodes in the network will be mistakenly notified. This will causes the irrelevant nodes to "wait" unnecessarily, thereby reducing the network performance. On the other hand, if the transmission power of the CTS signal is too small, then not all neighbor nodes may be notified. As a result, data collision may occur, thereby reducing the overall network performance as well. Therefore, what is needed is a method and system capable of reducing noise and expanding bandwidth capabilities in the multi-hop wireless network.

SUMMARY OF THE INVENTION

In light of the drawbacks of the current art, one aspect of the present invention is to provide a method for noise reduction in a multi-hop wireless network. The present method may include identifying a plurality of neighbor nodes with respect to a central node; sending a first communication signal to the plurality of neighbor nodes, wherein the first communication signal is only sent to the nodes that are considered as the plurality of neighbor nodes by the central nodes; and based on the first communication signal, when the central node is transmitting data to one of the plurality of neighbor nodes, the other nodes in the plurality of neighbor nodes do not send data in the same channel, thereby reducing the noise in the wireless network.

Another aspect of the present invention is to provide a system for noise reduction in the wireless network. The present system may include a receiving node capable of identifying a plurality of neighbor nodes so as to send a first communication signal to the plurality of neighbor nodes, wherein the first communication signal is only sent to the nodes that are considered as the plurality of neighbor nodes by the central nodes; and based on the first communication signal, when the central node is transmitting data to one of the plurality of neighbor nodes, the other nodes in the plurality of neighbor nodes do not send data in the same channel, thereby reducing the noise in the wireless network.

One object of the present invention is to overcome the problems faced in the conventional art so as to provide an effective resolution that can greatly expand network bandwidth and reduce noise, thereby enhancing the overall network performance. In accordance with the present invention, the present method and system may adjust a parameter for transmitting a communication signal so as to reduce noise and expand bandwidth of wireless the network. As a result, the overall network performance can be greatly improved in accordance with the present invention.

DETAILED DESCRIPTION OF THE INVENTION

The present invention provides a method and system having noise reduction and bandwidth expansion capabilities in multi-hop wireless communication. The present invention may be implemented by sending a communication signal before data transmission so as to prevent other nodes from sending data in the same communication channel, thereby reducing noise as well as data collision that may be generated among the nodes in the same multi-hop wireless network.

In one embodiment of the present invention, a transmitting signal (also known as a base node) may send the communication signal to a receiving signal (also know as a central node) before sending data in the multi-hop wireless network. For example, the transmitting signal (the base node) may first perform a short handshake with the receiving node (the central node) so as to request for an available communication channel for data transmission.

In one embodiment of the present invention, the communication signal may be implemented by sending a Request to Send (RTS) signal. For example, the transmitting node (the base node) may send an RTS signal to the receiving node (the central node) to request for an available communication channel for data transmission.

In another embodiment of the present invention, the communication signal may be implemented by sending a Clear to Send (CTS) signal. For example, when the receiving node (the central node) has an available channel for data transmission, the receiving node (the central node) may send out a CTS signal to the transmitting node (the base node) to notify the transmitting node (the base node) that there is an available channel for data transmission.

Additionally, in one embodiment of the present invention, the receiving node (the central node) may send out the CTS signal to its neighbor nodes to notify the neighbor nodes that the receiving node (the central node) is about to receive data. As a result, the neighbor nodes will not send data in the same channel as the one the transmitting node (the base node) and the receiving node (the central node) is occupying. The way the central node recognizes its neighbor nodes is described in details in conjunction with FIG. 3 below.

In accordance with the present invention, a parameter for sending the communication signal, such as a transmission speed and a transmission power of a Clear to Send signal, can be effectively adjusted so as to reduce the surrounding noise and to enhance the bandwidth of the network. The detail of the present invention is described below.

Figure 4:
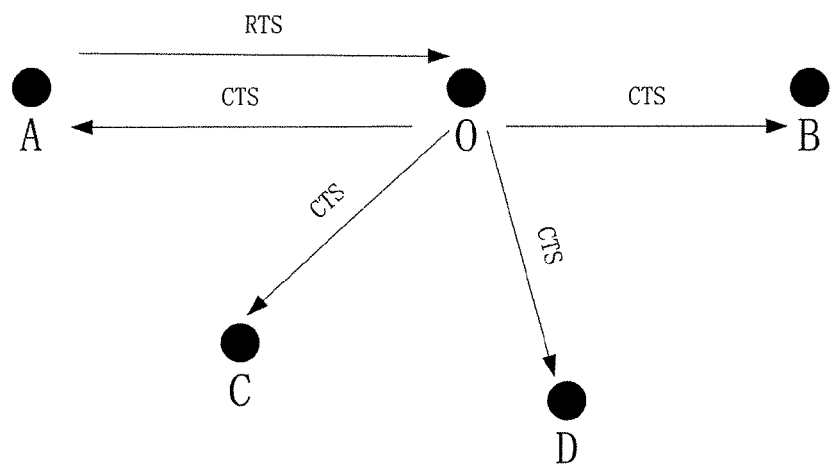
FIG. 4 illustrates an example of transmitting a communication signal in accordance with an embodiment of the present invention.

In accordance with the present invention, noise reduction and bandwidth expansion capabilities may be implemented by adjusting a parameter for transmitting the communication signal. FIG. 4 illustrates an example of transmitting a communication signal in accordance with an embodiment of the present invention. As shown in FIG. 4, in one embodiment of the present invention, node A, namely the transmitting node or the base node, may wish to communication with node 0, namely the receiving node or the central node. In this embodiment, node A may send out a communication signal, such as a Request to Send (RTS) signal, in a probe channel. If node 0 has an available channel, then node 0 may send a corresponding communication signal, such as a Clear to Send (CTS) signal, in the probe channel, so as to notify node A for data transmission.

In one preferred embodiment of the present invention, node 0, namely the central node, may further notify the surrounding nodes B, C, and D, namely the neighbor nodes, by sending out the CTS signal to the surrounding nodes so that the surrounding nodes will not transmit data in the same channel as the one node A is sending data to node 0, thereby avoiding data collision.

Figure 1:
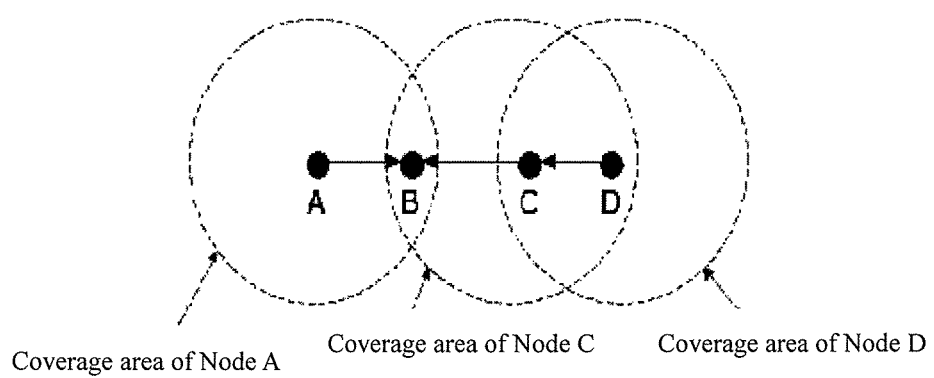
FIG. 1 is an example of a coverage area of each node in the wireless communication network in accordance with one embodiment of the present invention.
Figure 2:
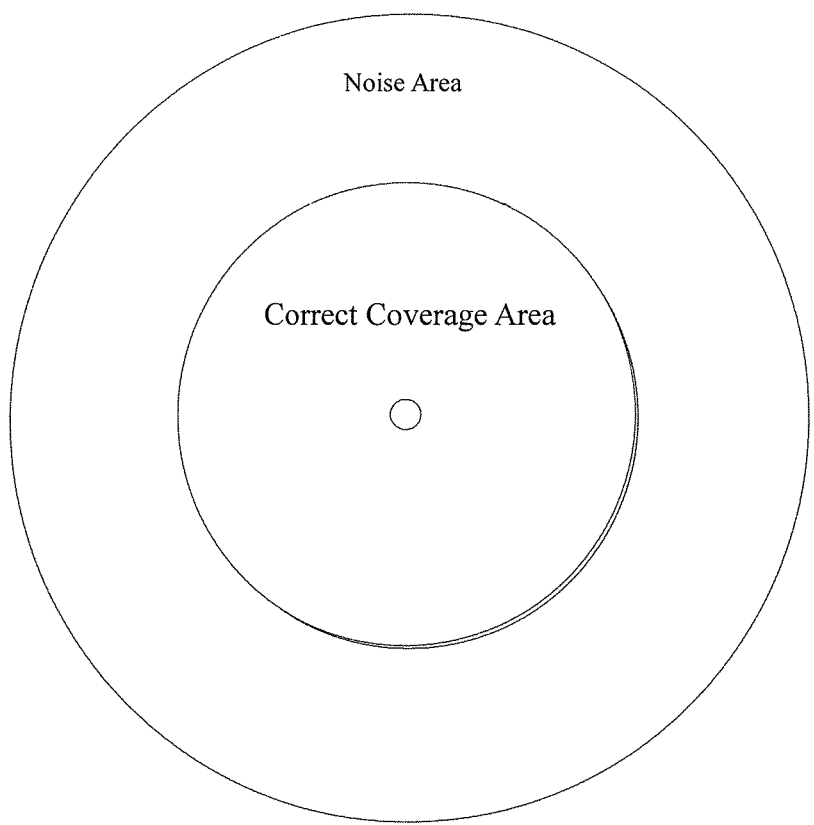
FIG. 2 illustrates an example of a correct coverage area and a noise area in accordance with an embodiment of the present invention.

In one embodiment of the present invention, a parameter for transmitting the communication signal may be a transmission speed. FIG. 2 illustrates an example of a correct coverage area and a noise area in accordance with an embodiment of the present invention. As shown in FIG. 2, the affected area for transmitting the communication signal may include a coverage area, which is the area the communication signal may be received. Additionally, the affected area for transmitting the communication signal may include a noise area, which is the area that may be interfered by the noise generated during data transmission.

In one embodiment of the present invention, the coverage area may be defined as the area where a signal-to-noise ratio (SNR) is greater than a limit required for an adjustment, whereas the noise area may be defined as the area where the signal is greater than the noise but less than the limit required for an adjustment. In accordance with the present invention, when the noise area is minimized, the network performance can be enhanced by increasing the transmission speed of the communication signal, such as the Clear to Send (CTS) signal. This is because when the transmission speed is adjusted higher, the transmission time is shortened; therefore, in any given time period, the utilization of the network is enhanced. However, when the transmission speed is increased, the SNR will also increase. Therefore, in order to reach the same coverage area, the transmission power will be increased accordingly, thereby increasing the noise area.

Take an example of a small dense wireless network, where all nodes can see each other. That is, all nodes are within the same coverage area. The noise area generated due to a high transmission speed will not greatly affect the nodes because all nodes are within the inner circle of the coverage area. In other words, all nodes can receive packet information correctly without being interfered by the noise created. As a result, adjusting the transmission speed higher in the small dense wireless network can enhance the network performance.

Take another example of a large wireless network, where not all nodes are centralized in the coverage area. In this case, the large noise area generated as a result of a high transmission speed will have a greater effect on the scattered nodes because some nodes may be affected more by the noise generated than others. Since lowering the transmission speed of the communication signal can reduce the overall interference, adjusting the transmission speed lower in the large wireless network can greatly increase the overall network performance.

In another embodiment of the present invention, the parameter for transmitting the communication signal may be a transmission power. In accordance with the present invention, the key to adjusting the transmission power of the communication signal is to obtain a balance between noise reduction and bandwidth expansion. When the transmission power is too large, the communication signal may mistakenly notify irrelevant nodes, causing the irrelevant nodes to "wait"

unnecessarily when the base node is transmitting data to the central node. As a result, the irrelevant nodes waste the time waiting when they could have perform their own data transmission with other nodes without causing any data collision. The overall network performance is, therefore, reduced due to the unnecessary delay.

On the other hand, when the transmission power is too small, the communication signal may not be able to reach all neighbor nodes. As a result, data collision may occur, reducing the overall network performance. Because the volume of the transmission power may affect which neighbor nodes receive the communication signal and which neighbor nodes do not, the node in accordance with the present invention may be provided with a self-control mechanism so as to change its transmission power subject to the environment and condition it resides in.

In accordance with the present invention, the transmission power for transmitting the communication signal, such as the Clear to Send (CTS) signal, may be adjusted so as to notify all nodes that may interfere with the node sending the communication signal. In order to reduce noise, the receiving node may need to control the transmission power utilized to send the CTS signal to each of its neighbor nodes such that only the least amount of transmission power is utilized to send the communication signal to the target nodes. This is because the transmission power utilized to reach all target nodes will determine the noise area generated in the network which will in turn affect the overall network performance.

Figure 3:
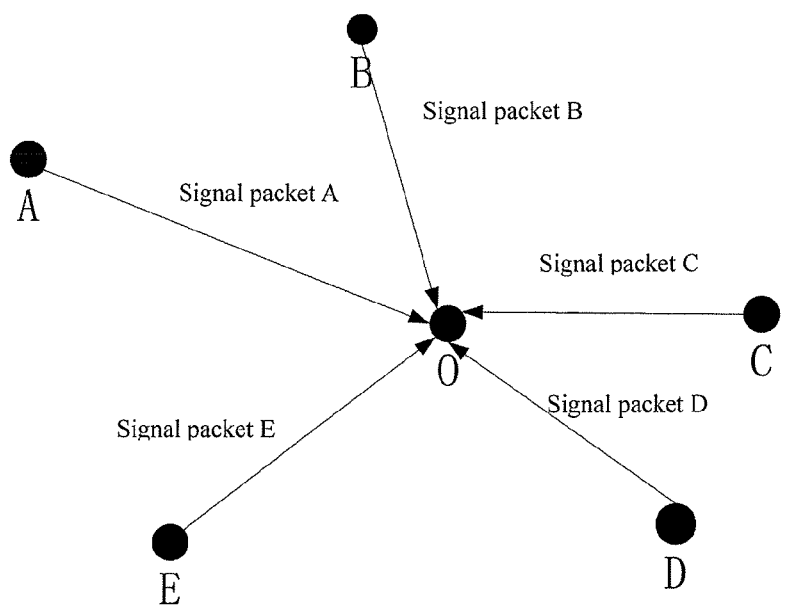
FIG. 3 illustrates an example of transmitting a signal packet in accordance with one embodiment of the present invention.

Refer to FIG. 3, which illustrates an example of transmitting a signal packet in accordance with one embodiment of the present invention. As shown in FIG. 3, in one embodiment of the present invention, the central node, namely node 0, may identify all nodes that send a signal packet, such as a protocol packet, to the central node as its neighbor nodes, namely nodes A, B, C, D and E. Therefore, the transmission power for sending the signal packet will determine which nodes will be identified as the neighbor nodes by the central node.

In one embodiment of the present invention, one way to adjust the transmission power for sending the signal packet is implemented by initially setting a maximum transmission power P for each node. The maximum transmission power may then be adjusted as the minimum transmission power needed for each node to reach its target nodes, such as the central node.

Then, each node in the wireless network may send out the signal packet, such as a protocol packet, with the transmission power determined to the central node such that the central node may recognize these nodes as its neighbor node. In accordance with the present invention, the transmission power for sending the signal packet may be determined by the following formula:

Signal Packet Power (SP Power)=maximum transmission power ($P$)+signal-to-noise ratio (SNR)

Wherein because each surrounding node needs to send out a signal packet to the central node to identify itself as the neighbor node, the transmission power for sending the signal packet may be the maximum transmission power P utilized by the neighbor nodes to send the signal packet to the central node, and the signal-to-noise ratio (SNR) may be the SNR of the transmission speed of a Clear to Send (CTS) signal.

In one embodiment of the present invention, because the specific environment, including the weather, temperature, and terrain, each node device is applied may be different from one another, the present invention introduces an environmental margin to the node device for marginal adjustment. In other words, the transmission power of the signal packet may be set as the sum of the maximum transmission power P utilized, the signal-to-noise ratio (SNR), and an environmental margin. That is, Signal Packet Power (SP Power)=maximum transmission power ($P$)+signal-to-noise ratio (SNR)+ environmental margin (margin)

Wherein because each surrounding node needs to send out a signal packet to the central node to identify itself as the neighbor node, the transmission power for sending the signal packet may be the maximum transmission power P utilized by the neighbor nodes to send the signal packet to the central node, the signal-to-noise ratio (SNR) may be the SNR of the transmission speed of a Clear to Send (CTS) signal, and the environmental margin may be a probe margin determined from a probe signal, such as a RNC (RTS no CTS) signal. For details of calculating the marginal value, please refer to the pending patent application Ser. No. 12/567,078, entitled "Wireless communication methods utilizing single antenna with multiple channels and the devices thereof" assigned to the same assignee.

In one preferred embodiment of the present invention, the method may further increase the period of the signal packet sent by each node and/or decrease the size of the signal packet so as to decrease the overall network resources utilized by the signal packet.

In accordance with the present invention, after receiving one or more signal packets, the central node may utilize the information obtained from the one or more signal packets to determine the transmission power needed to transmit the communication signal, for example, the transmission power of a CTS signal. In one embodiment of the present invention, the transmission power of the communication signal may be determined by the following formula:

Transmission power of the communication signal=Max(loss)+SNR

Wherein MAX(loss) is the maximum loss value that can be retrieved from the local table maintained in each neighbor node, and SNR may be the SNR of the transmission speed for transmitting the communication signal, such as the CTS signal.

In one embodiment of the present invention, because the specific environment, including the weather, temperature, and terrain, each node device is applied in may be different from one another, the present invention introduces an environmental margin to the node device for marginal adjustment. In other words, the transmission power of the communication signal may be set as the sum of the maximum loss value, the signal-to-noise ratio (SNR), and an environmental margin. That is, Transmission power of the communication signal=Max(loss)+signal-to-noise ratio (SNR)+ environmental margin (margin)

Wherein MAX(loss) is the maximum loss value that can be retrieved from the local table maintained in each neighbor node, SNR may be the SNR of the transmission speed for transmitting the communication signal, such as the CTS signal, and the environmental margin may be a probe margin determined from a probe signal, such as a RNC (RTS no CTS) signal. For details of calculating the marginal value, please refer to the pending patent application Ser. No. 12/567,078, entitled "Wireless communication methods utilizing single antenna with multiple channels and the devices thereof" assigned to the same assignee, as described above.

In another embodiment of the present invention, the present invention may further introduce a noise floor value with respect to the transmission power of the communication signal so as to make adjustment to the node device. In other words, the transmission power of the communication signal may be set as the sum of a maximum loss Max(loss), signal-to-noise ratio (SNR), an environmental margin (margin), and a noise floor value. That is, > Transmission power of the communication signal=Max(loss)+signal-to-noise ratio (SNR)+ environmental margin (margin)+noise floor value (NF)

Wherein MAX(loss) is the maximum loss value that can be retrieved from the local table maintained in each neighbor node, SNR may be the SNR of the transmission speed for transmitting the communication signal, such as the CTS signal, the environmental margin may be a probe margin determined from a probe signal, such as a RNC (RTS no CTS) signal, and the noise floor value may be the sum of all noises in the network. For details of determining the marginal value, please refer to the pending patent application Ser. No. 12/567,078, entitled "Wireless communication methods utilizing single antenna with multiple channels and the devices thereof" assigned to the same assignee, as described above.

As shown in FIG. 3, after receiving the respective signal packet from nodes A, B, C, D and E, node 0 may recognize the neighbor nodes that may be interfered when packet information is sent. These neighbor nodes are nodes A, B, C, D and E. Node 0 may retrieve the loss values from the local table maintained in nodes A, B, C, D and E and set the maximum loss value as Max(loss). Consequently, the central node may determine the transmission power for transmitting the communication signal from the above formula.

In another embodiment of the present invention, the present invention may reduce noise and expand bandwidth by adjusting both the transmission speed and the transmission power of the communication signal at the same time. Implementation of adjusting the transmission speed and the transmission power of the communication signal has already been described above.

While the invention has been described in conjunction with exemplary preferred embodiments, it is to be understood that many alternatives, modifications, and variations will be apparent to those skilled in the art in light of the foregoing description. Accordingly, the present invention embraces all such alternatives, modifications, and variations. All matters set forth herein or shown in the accompanying drawings are to be interpreted in an illustrative and non-limiting sense.

What is claimed is:

1. A method for reducing communication interference in a wireless network, said method comprising:
    identifying a plurality of neighbor nodes with respect to a central node;
    sending a first communication signal to said plurality of neighbor nodes, wherein said communication signal is only sent to nodes considered as said plurality of neighbor nodes by said central node;
    based on said first communication signal, when said central node is transmitting data with one of said plurality of nodes in a channel, the other nodes of said plurality of nodes do not send data in said channel, thereby reducing interference in said wireless network; and
    adjusting a transmission power for transmitting said first communication signal, wherein said transmission power is a sum of a maximum loss value between said central node and said plurality of neighbor nodes and a signal-to-noise ratio.

2. The method of claim 1, wherein said identifying step includes:
    checking for a signal packet so as to identify a node sending said signal packet as one of said plurality of said neighbor nodes with respect to said central node.

3. The method of claim 2, wherein a transmission power for transmitting said signal packet is a sum of a maximum transmission power transmitted and a signal-to-noise ratio.

4. The method of claim 3, wherein said transmission power is further adjusted by an environmental margin.

5. The method of claim 2, wherein said node periodically sends said signal packet to said central node.

6. The method of claim 5, wherein said node can adjust a transmission period of said signal packet or a size of said signal packet.

7. The method of claim 2, wherein said signal packet is a protocol packet.

8. The method of claim 1, wherein said first communication signal is a Clear to Send (CTS) signal.

9. The method of claim 1, wherein said transmission power is further adjusted by an environmental margin.

10. The method of claim 1, wherein said transmission power is further adjusted by a noise floor value, wherein said noise floor value is a sum of all noises in said wireless network.

11. The method of claim 1, further comprising adjusting a transmission speed of said first communication signal based on a size of said wireless network.

12. The method of claim 1, further comprising sending a second communication signal, wherein said second communication signal can be sent prior to said first communication signal such that said central node can send out said first communication signal to said plurality of neighbor nodes based on said second communication signal.

13. The method of claim 12, wherein said second communication signal is a Request to Send (RTS) signal.

14. A system for reducing interference in a wireless network, said system comprising:
    a receiving node capable of identifying a plurality of neighbor nodes with respect to said receiving node so as to send a first communication signal to said plurality of neighbor nodes, wherein said first communication signal is only sent to nodes considered as said plurality of neighbor nodes by said receiving node, and based on said first communication signal, when said receiving node is transmitting data with one of said plurality of neighbor nodes in a channel, the other nodes of said plurality of neighbor nodes do not send data in said channel, thereby reducing interference in said wireless network, wherein said receiving node can adjust a transmission power of said first communication signal, and wherein said transmission power is a sum of a maximum loss value between said receiving node and said plurality of neighbor nodes and a signal-to-noise ratio.

15. The system of claim 14, wherein said receiving node considers a node sending a signal packet to said receiving node as one of said plurality of neighbor nodes.

16. The system of claim 15, wherein a transmission power for transmitting said signal packet is a sum of a maximum transmission power transmitted and a signal-to-noise ratio.

17. The system of claim 16, wherein said transmission power is further adjusted by an environmental margin.

18. The system of claim 15, wherein said node periodically sends out said signal packet to said receiving node.

19. The system of claim 18, wherein said nodes can adjust a transmission period of said signal packet or a size of said signal packet.

20. The system of claim 15, wherein said signal packet is a protocol packet.

21. The system of claim 14, wherein said first communication signal is a Clear to Send (CTS) signal.

22. The system of claim 14, wherein said transmission power is further adjusted by an environmental margin.

23. The system of claim 14, wherein said transmission power is further adjusted by a noise floor value, wherein said noise floor value is a sum of all noise in said wireless network.

24. The system of claim 14, wherein said receiving node can adjust a transmission speed of said first communication signal based on a size of said wireless network.

25. The system of claim 14, further comprising a transmitting node for transmitting a second communication signal to said receiving node, wherein said second communication signal can be sent prior to said first communication signal such that said receiving signal can send out said first communication signal to said plurality of neighbor nodes based on said second communication signal.

26. The system of claim 25, wherein said second communication signal is a Request to Send (RTS) signal.

\* \* \* \* \*